United States Patent
Schafer et al.

(10) Patent No.: US 7,832,476 B2
(45) Date of Patent: Nov. 16, 2010

(54) DOWNHOLE RELEASE OF FRICTION REDUCERS IN GRAVEL PACKING OPERATIONS

(75) Inventors: Laura Schafer, Kuala Lumpur (MY); Carlos Abad, Richmond, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 358 days.

(21) Appl. No.: 11/867,054

(22) Filed: Oct. 4, 2007

(65) Prior Publication Data

US 2009/0090506 A1 Apr. 9, 2009

(51) Int. Cl.
*E21B 43/04* (2006.01)

(52) U.S. Cl. .................. 166/278; 166/51; 166/300

(58) Field of Classification Search .......... 166/278, 166/300, 51, 270.1
See application file for complete search history.

(56) References Cited

U.S. PATENT DOCUMENTS

| | | | |
|---|---|---|---|
| 3,373,107 A | 3/1968 | Rice | |
| 4,341,684 A | 7/1982 | Krantz | |
| 4,983,186 A | 1/1991 | Naiman | |
| 5,392,850 A * | 2/1995 | Cornette et al. ............ | 166/51 |
| 5,706,891 A * | 1/1998 | Schraub .................... | 166/51 |
| 5,902,784 A | 5/1999 | Hellsten | |
| 5,964,692 A | 10/1999 | Blezard | |
| 6,178,980 B1 | 1/2001 | Storm | |
| 7,205,262 B2 | 4/2007 | Schwartz | |
| 2004/0082668 A1 | 4/2004 | Vinson | |
| 2004/0220063 A1 | 11/2004 | Chappell | |
| 2006/0148660 A1 * | 7/2006 | Chen et al. ............... | 507/261 |
| 2008/0142225 A1 * | 6/2008 | Prado et al. .............. | 166/311 |

* cited by examiner

*Primary Examiner*—Shane Bomar
*Assistant Examiner*—Brad Harcourt
(74) *Attorney, Agent, or Firm*—David G. Matthews; David L. Cate; Lundeen & Lundeen PLLC

(57) ABSTRACT

A method of introducing friction reducing agents within a wellbore penetrating a subterranean formation during a gravel packing operation is accomplished by providing a length of tubing located downhole within the wellbore for conducting fluids within the wellbore through the tubing during circulating of gravel packing fluids introduced from the surface within the wellbore. At least a portion of the tubing is surrounded by a screen for screening out particulate matter during the gravel packing operation. An annular space is defined between an interior of the screen and the exterior of the tubing. A friction reducing agent is dispensed from a dispensing apparatus that locates downhole with the tubing. The dispensing apparatus includes a housing and a chamber disposed within the housing that has one or more outlets that open into the annular space defined by the screen and tubing for dispensing the friction reducing agent. The dispensing apparatus further includes a piston and a trigger mechanism for actuating the piston. When the trigger mechanism is activated to actuate the piston, the friction reducing agent is dispensed through the one or more outlets at a position downhole remote from the surface during the circulating.

19 Claims, 6 Drawing Sheets

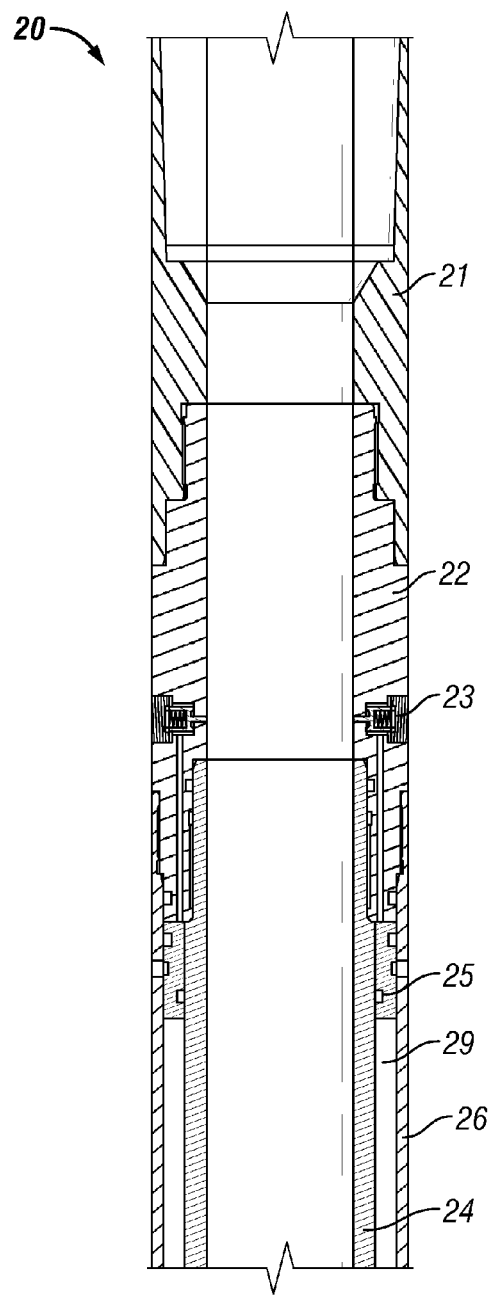
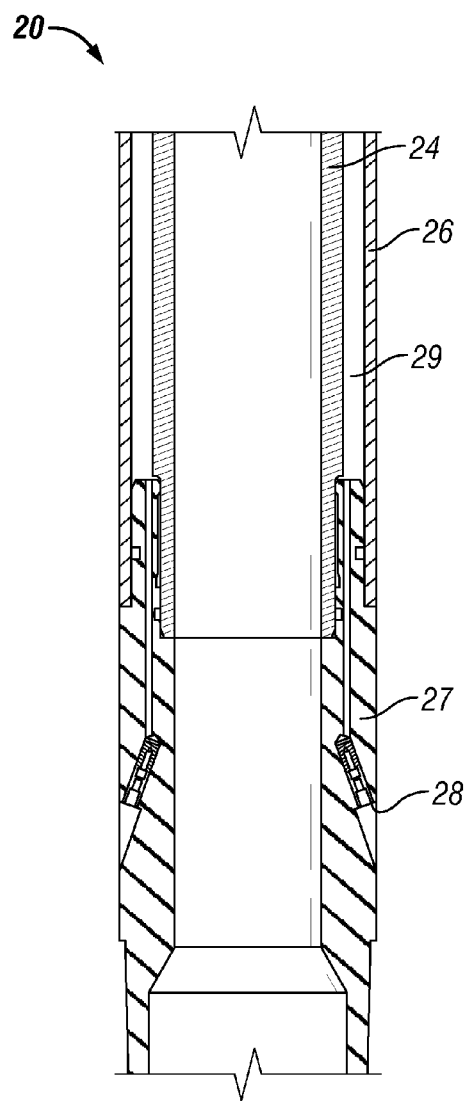
FIG. 3
FIG. 4

DOWNHOLE RELEASE OF FRICTION REDUCERS IN GRAVEL PACKING OPERATIONS

FIELD OF THE INVENTION

The invention is related to use of friction reducers in oilfield treatments. Specifically, the invention relates to dispensing of such friction reducers downhole in gravel packing operations.

BACKGROUND OF THE INVENTION

Gravel packing is used as a means of controlling sand production and to consolidate and prevent the movement of failed sandstone and/or increase the compressive strength of the formation sand. It can also serve as a filter to help assure that formation fines and formation sand do not migrate with the produced fluids into the wellbore. In a typical gravel pack completion, gravel is mixed with a carrier fluid and is pumped in a slurry mixture through a conduit, often drill pipe or coiled tubing, into the wellbore. The carrier fluid in the slurry is returned to the surface through a separate tubular or an annulus area, leaving the gravel deposited in the formation, perforation tunnels and wellbore where it forms a gravel pack.

High friction pressure is a known problem in gravel packing used in sand control and for supporting the matrix surrounding the wellbore, especially for high rate water packs in long open-hole intervals, such as those longer than 3000 ft. (915 m). High friction pressure is undesirable because it can result in high pressures in open hole sections that can exceed the fracturing pressure of the formation. Unintended fracturing during a gravel pack treatment leads to incomplete packing and loss of gravel to the formation, ultimately impairing productivity. If no friction reducing additive is used, when pumping through a 8.5 inch (21.6 cm) casing with 5.5 inch (14 cm) production tubing, for example, the pressure can rise up to that of water, namely up to 110 psi/1000 ft in the tubing (18 kPa/m of pipe) or up to 80 psi/1000 ft (14.5 kPa/m of casing) in the annulus when pumped at 20 barrels per minute (0.053 m$^3$/s). For wells at high depths, such as 20,000 ft. (6090 m), or 30,000 ft. (9144 m), excessive friction pressure can alter the well design in terms of limiting the drilled length of an horizontal zone, or in other cases being the difference between being able to effectively pumping a gravel packing or not when the pumping power at surface is limited.

Known methods to reduce friction pressure include the use of polymer-based gravel packing fluids and friction reducers, chemical additives known to reduce the friction pressure of flowing fluids. These polymers and friction reducing agents are added at the surface with the gravel packing fluids. The conventional polymeric friction reducing agents can degrade when exposed to high shear zones in the pipes or downhole tools due to shear induced degradation during the treatment, however, allowing pressures to increase over time.

Additionally, polymer materials that are combined with the gravel packing fluids at the surface to reduce friction can impair the flow through the gravel pack after the gravel packing operation is completed. Fluids from the reservoir may also reduce the effectiveness of the friction reducers added at the surface. The majority of the friction occurs between the washpipe and the screen in the return flow of fluid during the gravel packing treatment.

New methods are therefore needed for reducing friction in such types of treatments to overcome these and other obstacles.

SUMMARY OF THE INVENTION

The invention is directed to a method of introducing friction reducing agents within a wellbore penetrating a subterranean formation during a gravel packing operation. Specifically, the introduction is accomplished by providing a length of tubing located downhole within the wellbore for conducting fluids within the wellbore through the tubing during circulating of gravel packing fluids introduced from the surface within the wellbore. At least a portion of the tubing is surrounded by a screen for screening out particulate matter during the gravel packing operation. An annular space is defined between an interior of the screen and the exterior of the tubing. A friction reducing agent is dispensed from a dispensing apparatus that locates downhole with the tubing. The dispensing apparatus includes a housing and a chamber disposed within the housing that has one or more outlets that open into the annular space defined by the screen and tubing for dispensing the friction reducing agent. The dispensing apparatus further includes a piston and a trigger mechanism for actuating the piston. When the trigger mechanism is activated to actuate the piston, the friction reducing agent is dispensed through the one or more outlets at a position downhole remote from the surface during the circulating.

BRIEF DESCRIPTION OF THE DRAWINGS

For a more complete understanding of the present invention, and the advantages thereof, reference is now made to the following descriptions taken in conjunction with the accompanying figures, in which:

FIG. 3 shows an enlarged view of a section of the tool of FIG. 2;

FIG. 4 shows an enlarged view of a section of FIG. 2;

DETAILED DESCRIPTION OF THE INVENTION

Figure 1:
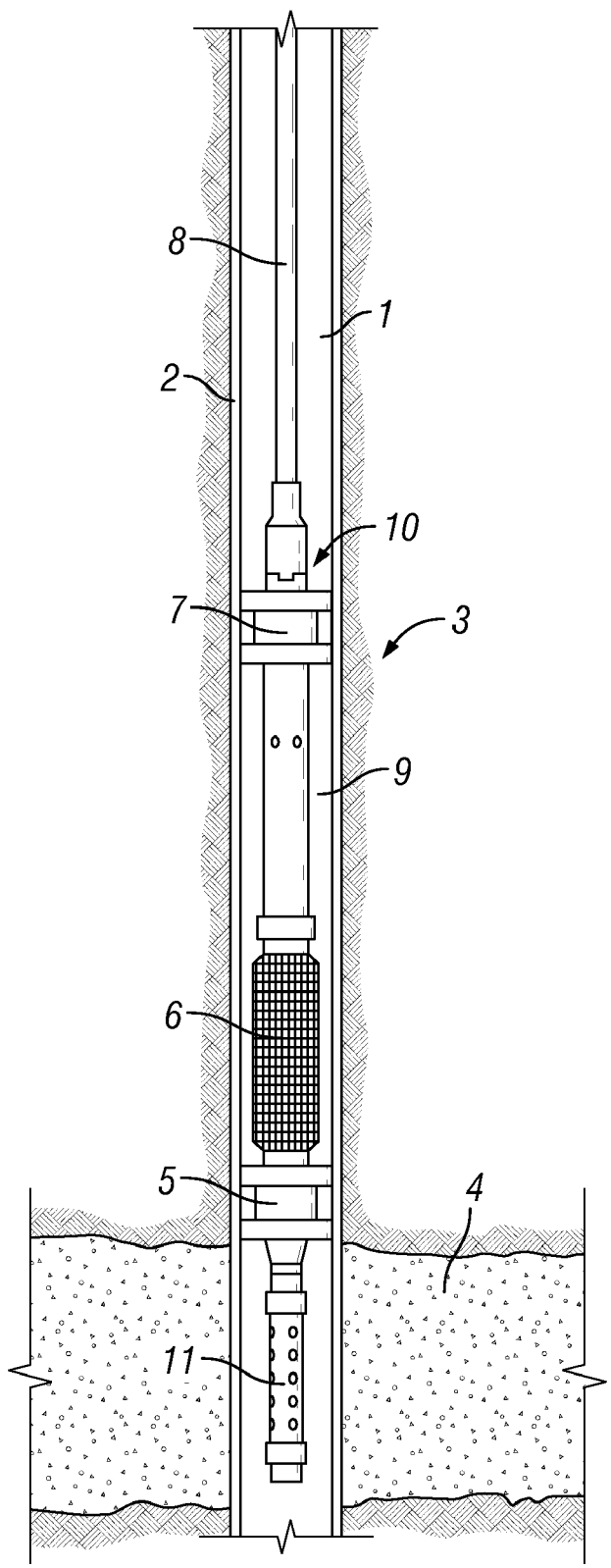
FIG. 1 shows a prior art packing tool disposed in a wellbore.

In the present invention, friction reducing agents are dispensed downhole in gravel packing operations. In high rate water packing treatments, gravel is placed in the annulus between a wellbore and a screen. In these treatments the gravel is suspended, carried, displaced and deposited by means of turbulent flow of a low viscosity aqueous fluid, as opposed to low rate gravel packing treatments where the fluid is viscosified by means of high concentrations of polymers such as hydroxyethyl cellulose (HEC) or viscoelastic surfactants (VES).

Friction pressure is of high concern in all gravel packing treatments, because contrary to other stimulation methods such as acidizing or fracturing, where the fluid is pumped into the reservoir, in gravel packing operation the fluid is partially circulated back to surface. This essentially doubles the pipe length through which the fluid is pumped. In addition the re-circulated fluid is pumped back into the well during the treatment, increasing the exposure time of the fluid to shear. This is especially important in high rate water packing treatments, as friction pressure exponentially increases for a given fluid with the pumping rate. Pumping rates may range from about 1 to about 100 barrels (about 0.0026 $m^3/s$ to about 0.25 $m^3/s$) per minute, more particularly, from about 5 to about 30 barrels per minute (about 0.013 $m^3/s$ to about 0.08 $m^3/s$)

Although low friction pressure is key for the placement of both low rate and high rate gravel packing treatments, the high concentrations of viscosifiers used in the former allow for lower friction pressures than those of brine to be obtained. For high rate water packs the fluid viscosity is not enough to ensure gravel suspension, and the friction pressure in the tubulars, annulus between borehole and screen, and in the production tubing is similar to that of water. In particular, friction reducing agents may be released downhole in high rate water pack treatments by means of the various embodiments of the present invention. The friction reducing agents dispensed downhole may be used in combination with friction reducing agents that are added at the surface or may be used without any surface added friction reducing agents.

Friction reducing agents to be used in gravel packing applications in accordance with the invention may be provided in the form of a solution, suspension, emulsion, gel or the like. The friction reducing agents may be polymers, including generally high molecular weight linear polymers or polymers that have been slightly crosslinked or drag reducing surfactant formulations or a combination of these. As used herein with reference to polymers, "high molecular weight" is meant to encompass those polymers having a molecular weight of from about 5 to about 25 million or more. These polymers may be pumped at low enough concentrations such that they do not significantly increase the viscosity of the fluid. Suitable polymers may include guar or a guar derived polymer. Examples of suitable synthetic polymers and copolymers include polymethylmethacrylate, polyethyleneoxide, polyacrylamide, polymethacrylamide, partially hydrolyzed polyacrylamide, cationic polyacrylamide derived polymers such as those obtained by radical polymerization of dimethylamino ethyl methacrylate (DMAEMA), 2-(methacryloyloxy)-ethyltrimethylammonium chloride (MADQUAT), methacrylamidopropyl trimethyl ammonium chloride (MAPTAC), or diallyldimethylammonium chloride (DADMAC), or anionic polymer such as polyAMPS (poly 2-acrylamido-2-methylpropane sulfonic acid), and the like.

Examples of suitable conventional friction reducers are those polyacrylamide derivatives commonly used in the field supplied as concentrated emulsified conventional drag reducing formulation, containing around 30% of active vinyl polymer. Suitable levels of friction reduction can be obtained with this chemical at concentrations of the order of about 0.75 ml/L to about 2 ml/L in water. Other polymers include high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Polymer based friction reducer concentrates are typically diluted at concentrations ranging between 0.1 mL/L and 5 mL/L, and more typically between 0.3 mL/L and 2.5 mL/L.

Bacterial origin polymers such as xanthan, diutan, and scleroglucan, three biopolymers, may also be useful as a friction reducing agent. Such friction reducing biopolymers are described in U.S. patent application Ser. No. 11/835,891, filed Aug. 8, 2007, which is herein incorporated by reference in its entirety.

The friction reducing agent may include viscoelastic surfactants (VES) or mixtures of viscoelastic surfactants, with or without other friction reducing polymers. Nonlimiting examples of suitable viscoelastic surfactant materials are described in U.S. Pat. Nos. 5,979,557 (Card et al.); 6,435,277 (Qu et al.) and 6,703,352 (Dahayanake et al.), which are each incorporated herein by reference in their entireties. The viscoelastic surfactants may include cationic surfactants, amphoteric surfactants, zwitterionic surfactants, including betaine surfactants, anionic surfactants and combinations of these.

The friction reducing fluid may comprise friction reducing surfactant formulations in combination with one or more polymeric or monomeric friction reducing enhancers. Such friction reduction enhancers and friction reduction materials are described in U.S. patent application Ser. No. 11/833,449, filed Aug. 3, 2007, which is incorporated by reference herein in its entirety. The surfactant friction reduction enhancers are used in concentrations of from about 1 mL/L to about 10 mL/L, and more typically from about 2.5 mL/L to about 6 mL/L, which may be in active concentrations of less than 4 g/L. Suitable friction reducing surfactants may include cationic surfactants, amphoteric surfactants, zwitterionic surfactants, anionic surfactants and combinations of these. Specific examples of suitable friction reducing surfactants, when used with a primary friction reduction enhancer, include cetyl trimethyl ammonium chloride and tallow trimethyl ammonium chloride. The polymeric friction reduction enhancers are polymers, which may be either cationic or anionic.

Optionally, a monomeric friction reduction enhancer may also be used in combination with the friction reducing surfactant. Such monomeric drag reduction enhancers are organic counterions, and may include monomers or oligomers of the polymeric drag reduction enhancer. An example of these friction reduction enhancers is (sodium) polynaphthalene sulfonate, as the polymeric friction reduction enhancer, and (sodium) naphthalene sulfonate, as the monomeric friction reduction enhancer.

Co-surfactants, which may have slightly different chemical natures from the main surfactant, may also be used. Thus, for example, the co-surfactant may be cationic if the main surfactant is anionic. Co-solvents, such as isopropyl alcohol, glycerol, ethylene glycol, propylene glycol, ethylene glycol monomethyl ether, and ethylene glycol monobutyl ether, may also be used.

In certain embodiments, dispersed solids may also be contained and dispensed from the canister. These solids may be suspended in a carrier fluid, in the form of suspensions or emulsions.

The friction reducing agent may be compatible with one or more heavy brines, such as seawater, NaCl, KCl, NaBr, $CaBr_2$, $CaCl_2$, etc. In such instances, the friction reducing agent would not cause precipitation in such brines and still be effective as a drag reducing agent. The choice of brine can also result in an improvement of the friction reduction capability of a given friction reducer, such as the polymer or surfactant based friction reducing agents.

The friction reducing agents may be released through a friction reducing agent dispensing apparatus that locates downhole with the tubing of the well. The friction reducing agents may be released downhole from such dispensing apparatus in response to various conditions. These may include increased pressures required for circulation of fluids due to 1) changes in the fluid hydrostatic head that can be altered by means of varying brine density of reduced gravel concentration in the wellbore; 2) fluid flow rate; and 3) reduced effectiveness of the friction reducing agents pumped at the surface, which may be caused by shear induced degradation or contact with fluids being produced from the reservoir, or with solids being deposited on the wellbore face during the drilling process.

Release of the friction reducing agents downhole in accordance with the invention may result in a pressure drop (DR) of from up to 50%, 60%, 70% or more. Such percentages of friction reduction is normally estimated from measurements of pressure in the well as a comparison of the pressure differential for the friction reducing fluid ($\Delta P_f$) as compared to the pressure differential of brine or water ($\Delta P_w$) (as determined by similar measurements or engineering correlations) and reported according to the following formula (1) below:

$$\% DR = \frac{\Delta P_w - \Delta P_f}{\Delta P_w} \times 100 \quad (1)$$

For pumping friction reducers at the surface, the selection of the most appropriate friction reducer among those commercially available is easily carried out currently by those skilled in the art taking into consideration parameters such as brine type, density, well dimensions (depth, casing and tube size), gravel packing tool ID and length, available high rate pumping horse power at surface, active concentration and viscosity of the friction reducer concentrate, available metering pumps and flow control devices, etc. Special attention may be given when water is replaced by heavy brines to the compatibility between brine and friction reducer, to ensure appropriate levels of performance are achieved.

The selection of the friction reducing agent to be pumped downhole may be carried out following analysis, although other parameters specific to the stability and effectiveness of the friction reducer concentrate, its viscosity and pumpable concentration at downhole pressure and temperature are of concern, as well as the specific design of the tool deployed to deliver the friction reducer downhole.

The dispensing apparatuses in accordance with embodiments of the invention may be disposed on a downhole tool, tubing or pipe, such as a wash pipe of a sand control service tool. Such devices may include mechanisms for triggering the deployment of the reagents at the desired time. Devices used to dispense reagents or chemicals for various purposes, for example, to break fluid loss control agents in gravel packing operations or the like have been described in U.S. patent application Ser. No. 11/639,031, filed Dec. 14, 2006, which is incorporated herein by reference in its entirety. For brevity of description, "canister" will be broadly used to describe various apparatuses of the invention that include chambers for storing and dispensing reagents, chemicals, fluids, or the like.

In accordance with embodiments of the invention, a canister for dispensing friction reducing agents downhole may be incorporated into a downhole tool, for example in the collar or housing of a downhole tool or tubing. Various downhole tools and tubing strings can potentially be modified to have a chamber (container or canister) for deployment of friction reducing agents and other chemicals and reagents in accordance with embodiments of the invention. While embodiments of the invention may be used with various downhole tools or tubings, for clarity, the following description mainly uses tools and tubings used in gravel packing to illustrate embodiments of the invention.

An example of a downhole tool used in gravel packing may be found in U.S. Pat. No. 6,220,353 issued to Foster et al., which discloses a full bore set down (FBSD) tool assembly for gravel packing in a well. This patent is assigned to the present assignee and is incorporated by reference in its entirety. FIG. 1 shows a schematic of a service string 3 disposed in a wellbore 1. The service string 3 includes a perforating gun 11 aligned with the zone to be produced, a bottom packer 5, a sand screen 6, a gravel pack tool assembly 10, and a tool assembly packer 7. The service string 3 is supported by a tubing string 8 extending to the surface. In this embodiment, the perforating guns are fired to perforate the production zone. Then, the service string 3 is lowered to align the packers 5, 7 above and below the perforations, and then the packers 5, 7 are set to isolate the production zone and define an annulus area between the service string 3 and the casing 2. The gravel packing is then performed and the zone produced. The friction reducing dispensing apparatus in accordance with the invention may be incorporated with such prior art packing tools.

A typical gravel pack operation includes three operations (among others) referred to as the squeeze operation, the circulating operation, and the reverse operation. In the squeeze operation, the gravel slurry is forced out into the formation 4 by pumping the slurry into the production zone while blocking a return flow path. The absence of a return flow path causes the pressure to build and force the slurry into the formation 4. When the void spaces within the formation 4 are "filled," the pressure will rise quickly, referred to as "tip screen out." Upon tip screen out, the next typical step is to perform a circulating operation in which the gravel slurry is pumped into the annular area between the sand screen 6 and the casing 2. In the circulating position, the return flow path is open and the return fluid is allowed to flow back to the surface. The sand screen 6 holds the gravel material of the gravel slurry in the annular area, but allows fluids to pass therethrough. Thus, circulating the gravel slurry to the sand screen 6 deposits the gravel material in the annular area. However, during the circulating operation, when the deposited gravel material reaches the top of the sand screen 6, the pressure will rise rapidly, indicating screen out and a full annulus. Note that an alternative manner of operating the tool is to perform the squeeze operation with the tool assembly 10 in the circulate position and with a surface valve (not shown) closed to prevent return flow. Using this method, the shift from the squeeze operation to the circulate operation may be made by simply opening the surface valve and without the need to shift the tool.

When the annulus is packed, the string may be pulled from the wellbore 1. However, to prevent dropping of any gravel material remaining in the service string 3 and the tubing 8 into the well when pulling the string from the well, the gravel in the tubing 8 and service string 3 is reverse circulated to the surface before the string is removed. This procedure of reverse circulating the remaining gravel from the well is referred to as the reverse operation. In general, the flow of fluid is reverse circulated through the tubing 8 to pump the gravel remaining in the tubing string 8 and service string 3 to the surface.

Canisters in accordance with embodiments of the invention may be used with various downhole tools or tubings, such as the tool assembly 10 shown in FIG. 1. The general features of a canister of the invention may include: a chamber (e.g., an annular chamber), a piston that can slide in the chamber, a mechanism to activate (push) the piston, and one or more outlets (ports) to dispense the content stored in the chamber into the annular space defined by the interior of the screen and the exterior of the tubing.

Figure 2:
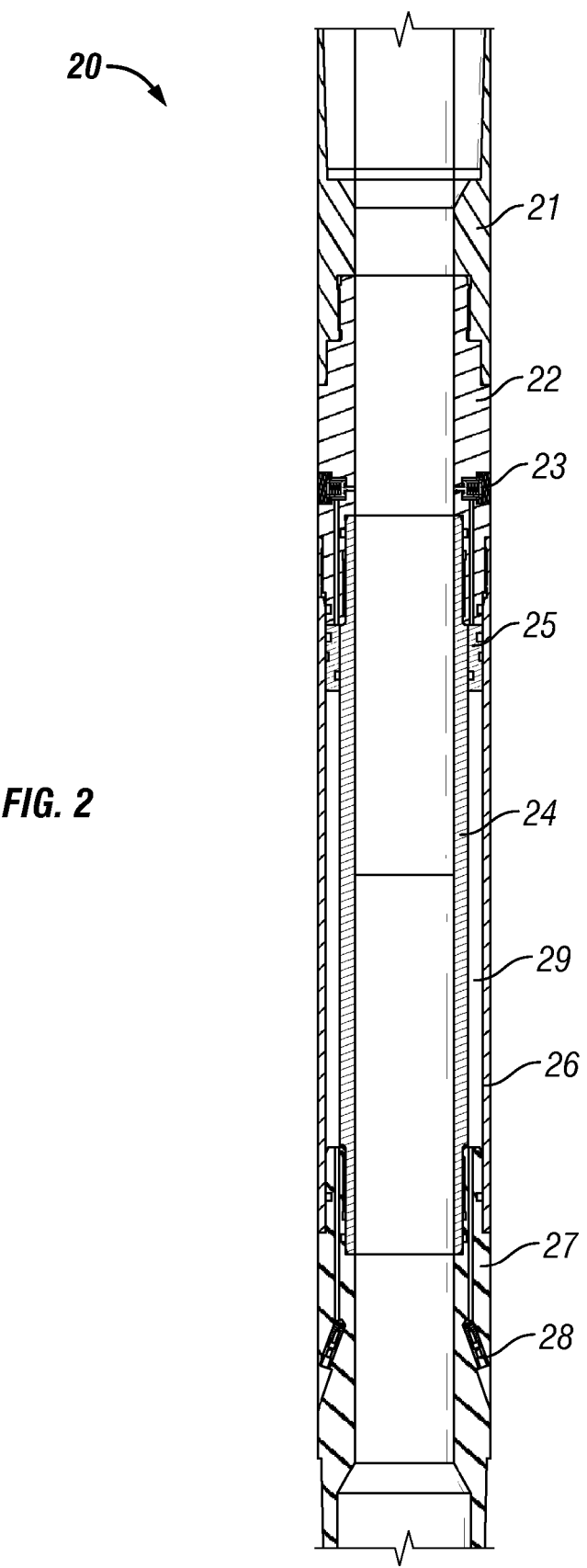
FIG. 2 shows a longitudinal cross section of a tubing section having a friction reducing agent dispensing apparatus for deployment of friction reducing chemicals in accordance with an embodiment of the invention.

FIG. 2 shows an example of a downhole tubing string (e.g., a wash pipe) incorporating a canister of the invention. FIGS. 3 and 4 show sections of the same tool in expanded views. In this particular example, the downhole tool or tubing is a wash pipe, which is shown as having a box×pin joint. However, in other embodiments, the canisters may be incorporated into other downhole tools or tubings.

Figure 6:
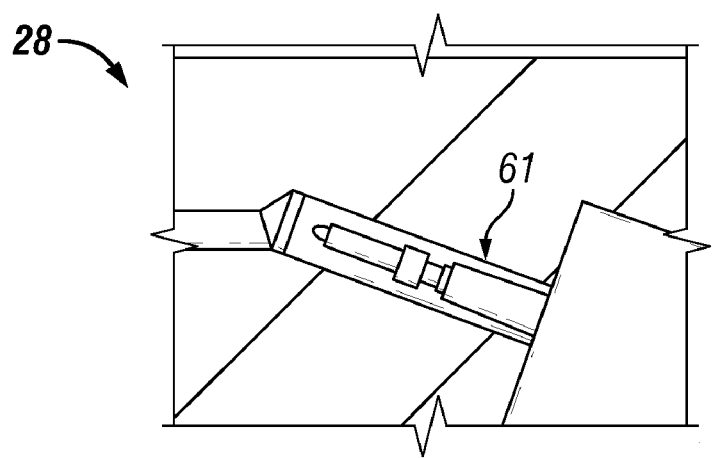
FIG. 6 shows an injection port in accordance with one embodiment of the invention.

As shown in FIGS. 2-4, a downhole tool 20 comprises: an upper sub 21 with a premium flush thread, a crossover 22 containing a modified poppet valve 23 (which will be described in more detail with reference to FIG. 7) for activation at selected depth (or pressure), a mandrel 24, a free-floating piston 25 located inside a pressure-containing housing 26 and mounted on the outside (od) of the mandrel 24, and a lower sub 27 containing one or more injection ports 28 to allow the friction reducing agents to be dispersed. As shown in FIG. 6, the injection port 28 includes a check valve 61 to allow the chemicals to be dispensed outward, while preventing outside fluids from entering the canister. The space between the housing 26 and mandrel 24 defines a chamber 29 for storing the friction reducing agents. Note that in some embodiments, the housing 26 and the mandrel 24 may be an integral part. In this case, the chamber 29 may be viewed as disposed inside the wall of the housing 26.

Figure 5:
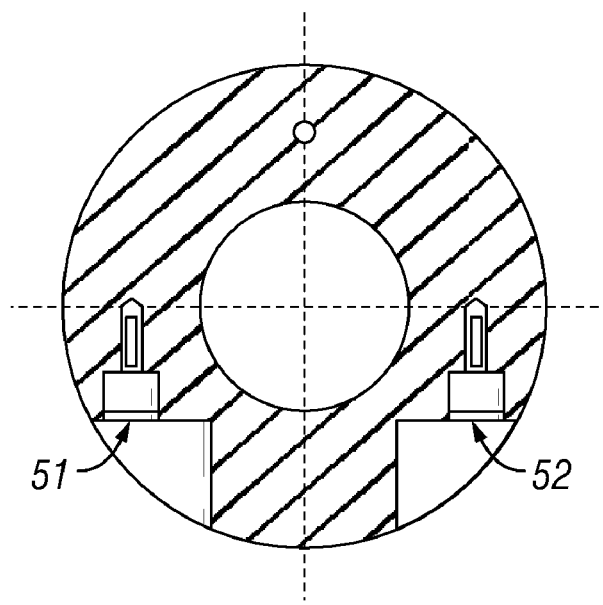
FIG. 5 shows a cross section of a tool, illustrating fill and bleed ports, in accordance with an embodiment of the invention.

The lower sub 27 may also contain a fill port and a bleed port and a premium flush thread. FIG. 5 shows a transverse section of the lower sub 27, illustrating the fill port 51 and the bleed port 52. Note that the fill port 51 and the bleed port 52 may also be disposed at other locations of the canister, for example in the upper sub 21 or in the housing 26 between the upper sub 21 and the lower sub 27. The fill port 51 and the bleed port 52 allow the chemicals to be filled in the annular chamber 29 between the housing 26 and the mandrel 24 and in front of the piston 25.

Figure 7:
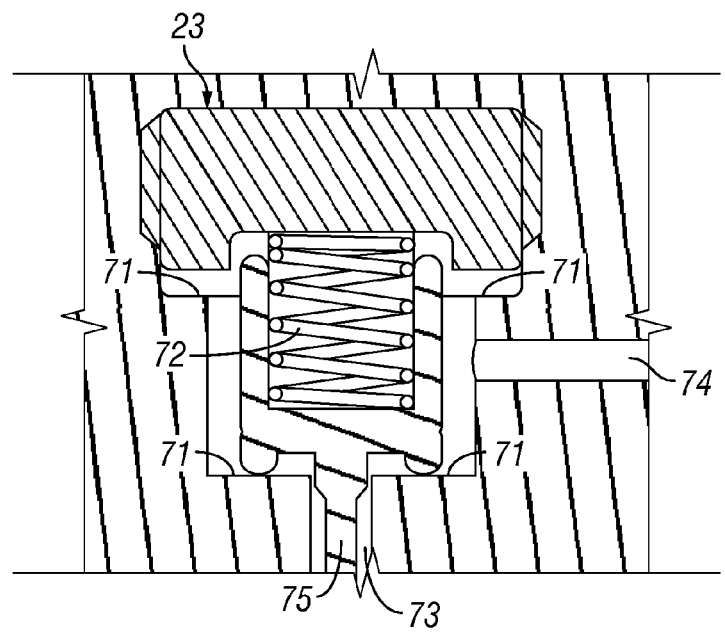
FIG. 7 shows a modified poppet valve in accordance with one embodiment of the invention.

FIG. 7 shows an expanded view of a modified poppet valve 23 that may be used with canisters of the invention. The poppet valve 23 has an opening 73 that faces the lumen of the tubing. In the closed state, the spring 72 pushes a plug to seal the opening 73. When the pressure inside the tubing is high enough to push open the opening 73, the pressure will be conducted to the conduit 74 to push the piston (shown as 25 in FIG. 2) to dispense the friction reducing agents. Note that the poppet valve shown in FIG. 7 is an example. Other devices, including mechanically operated ones, may also be used. For example, the poppet valve may be replaced with any valve (e.g., a ball valve or a sleeve valve) that is suitable for downhole use. Such other valves may be opened and closed by operating a shifting tool, which may be attached in the lumen of the tubing.

As shown in FIG. 2, a canister of the invention may be incorporated into a housing of a downhole tubing or a tool (including a collar). In this particular embodiment, the piston and the chamber for storing the friction reducing agents or other chemicals have an annular shape—along the circumference of the housing. However, other embodiments may have different shapes. For example, the annular shape as shown in FIG. 2 may be divided into two semispherical shapes or a plurality of tubular shapes in the wall of the housing. While the example in FIG. 2 has the canister designed inside the housing of the wash pipe, in other embodiments, a canister of the invention may be a separate part disposed on the inside (lumen) or outside of a tubing or a downhole tool.

A canister of the invention may be dimensioned to suit the purposes of the selected operations. How to determine a suitable dimension is known to one skilled in the art. For example, a canister in accordance with embodiments of the invention for use in gravel packing may be designed to dispense a selected volume (e.g., from about 5 $in^3$ (82 cc) to about 100 $in^3$ (1638 cc) or more of a chemical per foot (0.3 m) of screen run). The typical active concentration of friction reducer concentrates ranges from about 25 to about 40 wt. %. These concentrations are typically diluted at concentrations ranging from about 0.1 ml/L to about 5 ml/L, and more typically from about 0.3 ml/L to about 2.5 ml/L for polymer based friction reducers, and ranges from about 1 ml/L to about 10 ml/L, and more typically from about 2.5 ml/L to about 6 ml/L for surfactant based friction reducers. Only a portion of the treatment fluid may require friction reducer, however, as friction pressure does not become prohibitive in many treatments until the development of the beta wave. In certain instances, the friction reducer would only be reduced at the tail end of the gravel packing treatment, requiring significantly less chemical and ensuring only the portion of the treatment that required friction reduction was dosed.

The polymer based friction reducers can degrade when exposed to high shear during long enough periods of time. When the friction reducer is pumped at surface, this degradation results in gravel packing applications with higher friction pressures than initially designed for.

The method of the invention allows for the friction reducer to be released downhole at the time it is most required, and in the place where it is needed. The release of friction reducer downhole allows for effective friction reduction in the horizontal section and during the return flow.

The canisters can be placed in the wash pipe of the gravel packing string, downstream of the packer, or where enough space is available, upstream of the packer. Pressure difference measurements monitored across the two flow paths of the packer may be used as a trigger pressure for the canister, both upstream and downstream the packer.

Canisters for use with the friction reducing agents are intended to be used downhole. Therefore, such canisters may be constructed to withstand the downhole conditions, such as high pressures (e.g., 9000 psi or 62,000 kPa) and high temperatures (e.g., 250° F. or 121° C.). The canisters of the invention may be incorporated in the housing wall or in a configuration that does not substantially reduce the opening of the lumen, as shown in FIG. 2. Common wash pipes may have diameters between 2 and 4 in (about 5-10 cm) for use in cased holes.

Figure 8:
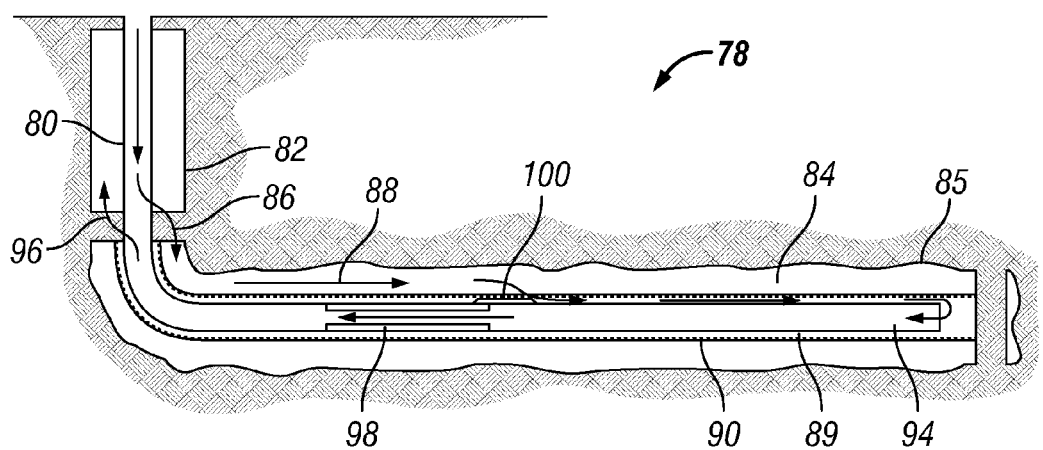
FIG. 8 shows a downhole tool, illustrating the introduction of a friction reducing agent from a dispensing apparatus of the invention.

With reference to FIG. 8, an openhole gravelpack assembly 78 employing a canister in accordance with the invention is shown. A gravel slurry is pumped down tubing section 80 within an encased hole section 82 and enters the annulus 84 of the openhole section 85 via crossover section 86, as indicated by the arrows 88. The gravel slurry deposits gravel along the annulus 84 until a gravel pack is formed within the annulus. Clean fluid from the slurry leaks through the screen assembly 90 and returns through the annular space between the screen 90 and washpipe 89. Return flow of the clean fluid enters the end 94 of the washpipe 89 and flows through the washpipe 89 into the annulus of the encased hole section 82 through the crossover 96, as shown.

When the fluid pressure within the annulus between the screen 90 and washpipe exceeds a preselected level or another trigger mechanism or condition is reached, a canister 98 containing a friction reducing agent is triggered to release the friction reducing agent into the clean fluid within the annular space between the interior of the screen 90 and the exterior of the washpipe 89, as shown at 100.

With reference to FIG. 2 and FIG. 7, one example of specific operations of a canister for release of friction reducing agents during gravel packing operations is as follows. When pumping the gravel packing fluids, the pressures required to pump or circulate the fluids may increase during the gravel packing operation. This may be due, for example, to the degradation of friction reducers initially added at the surface to the gravel packing fluids, fluid density or flow rate changes, or even fluid temperature. This increases the internal pressure within the internal lumen of the tube that includes the canister. The increased pressure inside the tubing pushes open the poppet valve (shown as 23 in FIG. 2 and FIG. 3). Referring to FIG. 7, the hydraulic pressure 75 pushes against a plug that blocks the opening 73 of the poppet valve, allowing the pressure to be transduced to the conduit 74 to push the piston (shown as 25 in FIG. 2 and FIG. 3). The poppet valve may be adjusted to operate under the pressure expected downhole. When the piston 25 is pushed, it slides along the annular chamber 29 to push out the friction reducing agents stored in the annular chamber 29. The friction reducers are thus dispensed through injection ports 28 into the annular space defined between an interior of the screen and the exterior of the tubing.

In addition to pressure activation, the activation of the canister may also be accomplished by mechanical means. Activation by mechanical means may be used to release the friction reducing agent in response to increased pressure, and in response to other conditions, such as increase fluid flow rate. As shown in FIG. 7, a mechanical device may generate a mechanical force to push against the opening 73 of the poppet valve. The mechanical means, for example, may be a shifting tool arranged on the inside (lumen) of the tool. The shifting tool may be pulled or pushed to activate the canisters. The use of a shifting tool to activate a device downhole is well known in the art.

Figure 9:
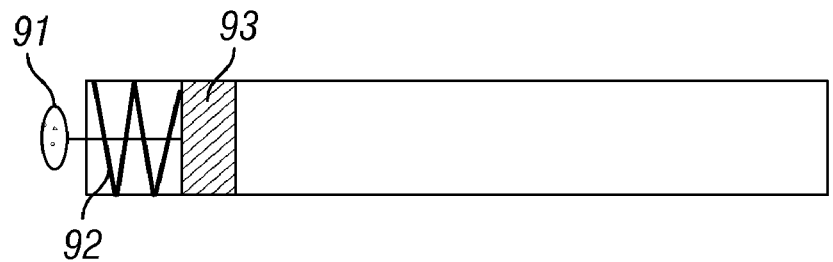
FIG. 9 shows a friction reducing agent dispensing apparatus having a mechanical trigger mechanism in accordance with one embodiment of the invention.

FIG. 9 shows a schematic illustrating one embodiment of a mechanical means that can be used to control the activation of a canister of the invention. As shown, a stopping mechanism 91 prevents the piston 93 from sliding to the right. The piston 93 is biased to move to the right in this illustration by a biasing spring 92 (or a similar mechanism). If a shifting tool (or other device) is used to release the stopping mechanism 91, the free-floating piston 93 in the canister will start to move to dispense the content of the canister. This is only one example of how a mechanical means may be used with a canister of the invention. One of ordinary skill in the art would appreciate that other variations are possible without departing from the scope of the invention.

In accordance with some embodiments of the invention, multiple canisters may be incorporated in a single wash pipe (or other tubings) or a downhole tool. The multiple canisters (or cartridges) may be filled with same or different friction reducing agents, chemicals or reagents. These cartridges may have individual pistons for deploying chemicals when pressured against or shifted by set down or pull force by using a shifting tool.

Figure 10:
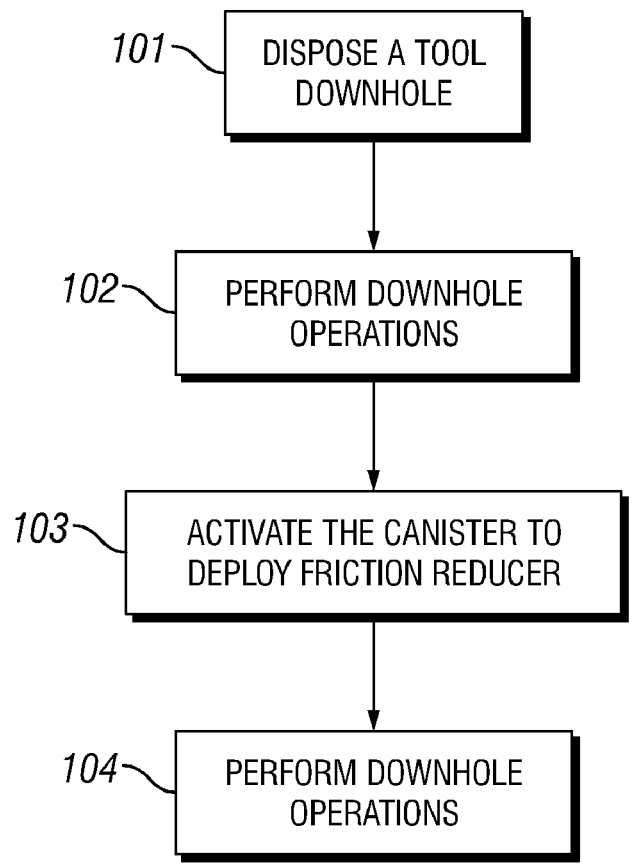
FIG. 10 shows a flow chart illustrating a method in accordance with one embodiment of the invention.

FIG. 10 illustrates a general process for performing a downhole operation using a canister of the invention. As shown, a tool for performing the downhole operation is first set downhole (step 101). The tool includes a canister of the invention, which may store the friction reducing agents for use downhole. Then, some operations may be performed using the tool (step 102). When deployment of the friction reducing agent is desired, the canister is activated (step 103). Activation of the canister, as noted above, may be accomplished by various means. After deployment of the friction reducing agents, the downhole operations may be continued if needed (step 104). Afterwards, the tool may be pulled out of the hole. The process illustrated in FIG. 10 is for illustration purpose only. One of ordinary skill in the art would appreciate that modifications to this process are possible without departing from the scope of the invention.

The addition of friction reducing agents downhole may be "on demand" by a signal from the surface. The canisters allow concentrated friction reducers to be released in the zones of their intended use. This may also save time and costs because there is no need to pump a large volume from the surface. Canisters of the invention may be constructed on any downhole tool or tubings. They can be configured to have minimal impact on the normal operations downhole or to have minimal impact on fluid flow resistance. Multiple canisters may be used, allowing deployment of different chemicals in different zones and/or different times, including some with non-friction reducing agents.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of introducing friction reducing agents within a wellbore penetrating a subterranean formation during a gravel packing operation, the method comprising:
   a squeeze operation;
   a circulating operation comprising circulating a gravel packing fluid introduced from the surface through a length of tubing located downhole within the wellbore, at least a portion of the tubing being surrounded by a screen to screen out particulate matter during the gravel packing operation, wherein an annular space is defined between an interior of the screen and the exterior of the tubing;
   a reverse circulating operation;
   providing a friction reducing agent dispensing apparatus that locates downhole with the tubing comprising:
      a housing;
      a chamber disposed within the housing that has one or more outlets that open into the annular space defined by the screen and tubing for dispensing the friction reducing agent;
      a piston configured to move in the chamber; and
      a trigger mechanism for actuating the piston so that the friction reducing agent is dispensed through the one or more outlets; and
   activating the trigger mechanism to actuate the piston so that the friction reducing agent is dispensed through the one or more outlets at a position downhole remote from the surface during the circulating operation to reduce friction pressure.

2. The method of claim 1, wherein the fluid is circulated at a rate of from about 1 to about 100 barrels per minute (about 0.0026 m$^3$/s to about 0.25 m$^3$/s).

3. The method of claim 1, wherein: the friction reducing agent is a high molecular weight polymer.

4. The method of claim 1, wherein: friction reducing agents are also combined with the gravel packing fluids introduced at the surface.

5. The method of claim 1, wherein: the friction reducing agent is comprised of a surfactant.

6. The method of claim 5, wherein: the surfactant is at least one of a cationic surfactant, an amphoteric surfactant, a zwitterionic surfactant, an anionic surfactant or a combination of these.

7. The method of claim 5, wherein: the friction reducing agent further includes a friction reducing enhancer.

8. The method of claim 7, wherein: the friction reducing agent is comprised of at least one friction reducing enhancer selected from at least one of polymeric and monomeric friction reducing enhancers.

9. The method of claim 1, wherein: the fluid comprises a calcium-containing brine.

10. The method of claim 1, wherein: the housing forms a portion of the tubing.

11. The method of claim 1, wherein: the trigger mechanism is activated in response to a selected pressure differential of fluid within the annular space defined by the screen and tubing and return flow within the interior of the tubing.

12. The method of claim 1, wherein: the trigger mechanism is activated in response to a selected pressure difference between the interior and exterior of the tubing.

13. The method of claim 1, wherein: there are at least two friction reducing agent dispensing apparatuses that locate downhole with the tubing.

14. The method of claim 1, wherein: the trigger mechanism is a poppet valve.

15. The method of claim 1, wherein: the trigger mechanism is a mechanical mechanism.

16. The method of claim 1, wherein: the trigger mechanism is activated in response to a selected flow rate across a portion of the tubing.

17. The method of claim 1, wherein: the trigger mechanism is activated in response to a selected absolute pressure within the tubing.

18. A method of introducing friction reducing agents within a wellbore penetrating a subterranean formation during a gravel packing operation, the method comprising:
a circulating operation comprising circulating a gravel packing fluid introduced from the surface through a length of tubing located downhole within the wellbore, at least a portion of the tubing being surrounded by a screen to screen out particulate matter during the gravel packing operation, wherein an annular space is defined between an interior of the screen and the exterior of the tubing, wherein the fluid is circulated at a rate of from about 1 to about 100 barrels per minute (about 0.0026 m$^3$/s to about 0.25 m$^3$/s);
providing a friction reducing agent dispensing apparatus that locates downhole with the tubing comprising:
a housing forming a portion of the tubing;
a chamber disposed within the housing that has one or more outlets that open into the annular space defined by the screen and tubing for dispensing the friction reducing agent;
a piston configured to move in the chamber; and
a trigger mechanism for actuating the piston so that the friction reducing agent is dispensed through the one or more outlets; and
activating the trigger mechanism to actuate the piston so that the friction reducing agent is dispensed through the one or more outlets at a position downhole remote from the surface during the circulating operation.

19. A method of introducing friction reducing agents within a wellbore penetrating a subterranean formation during a gravel packing operation, the method comprising:
a squeeze operation;
a circulating operation comprising circulating a gravel packing fluid introduced from the surface through a length of tubing located downhole within the wellbore, at least a portion of the tubing being surrounded by a screen to screen out particulate matter during the gravel packing operation, wherein an annular space is defined between an interior of the screen and the exterior of the tubing, wherein the fluid is circulated at a rate of from about 1 to about 100 barrels per minute (about 0.0026 m3/s to about 0.25 m$^3$/s);
a reverse circulating operation;
providing a friction reducing agent dispensing apparatus that locates downhole with the tubing comprising:
a housing forming a portion of the tubing;
a chamber disposed within the housing that has one or more outlets that open into the annular space defined by the screen and tubing for dispensing the friction reducing agent;
a piston configured to move in the chamber; and
a trigger mechanism for actuating the piston so that the friction reducing agent is dispensed through the one or more outlets; and
activating the trigger mechanism, in response to a selected pressure differential of fluid within the annular space defined by the screen and tubing and return flow within the interior of the tubing, to actuate the piston so that the friction reducing agent is dispensed through the one or more outlets at a position downhole remote from the surface during the circulating operation.

* * * * *